(12) United States Patent
Eppard

(10) Patent No.: US 7,905,786 B2
(45) Date of Patent: Mar. 15, 2011

(54) DECOUPLING MECHANISM FOR POWER TOOLS

(75) Inventor: Erin F. Eppard, Phoenix, AZ (US)

(73) Assignee: Robert Bosch GmbH, Stuttgart (DE)

( * ) Notice: Subject to any disclaimer, the term of this patent is extended or adjusted under 35 U.S.C. 154(b) by 521 days.

(21) Appl. No.: 12/030,312

(22) Filed: Feb. 13, 2008

(65) Prior Publication Data
US 2008/0200263 A1    Aug. 21, 2008

Related U.S. Application Data

(60) Provisional application No. 60/902,195, filed on Feb. 20, 2007, provisional application No. 60/902,196, filed on Feb. 20, 2007, provisional application No. 60/922,486, filed on Apr. 9, 2007.

(51) Int. Cl.
  *F16D 7/08*    (2006.01)
(52) U.S. Cl. ....... 464/36; 464/47; 83/DIG. 1; 192/56.57
(58) Field of Classification Search .......... 464/36, 464/46, 47; 192/56.53, 56.54, 56.56, 56.57; 83/543, DIG. 1
See application file for complete search history.

(56) References Cited

U.S. PATENT DOCUMENTS

| | | | |
|---|---|---|---|
| 1,672,582 A | 6/1928 | Tenney | |
| 1,736,970 A | 11/1929 | Haas | |
| 1,865,356 A * | 6/1932 | Daum | ......................... 464/36 X |
| 2,344,673 A | 3/1944 | Brown | |
| 2,683,362 A | 7/1954 | Bowman | |
| 2,802,354 A | 8/1957 | Bohnhoff et al. | |
| 3,119,247 A | 1/1964 | Grabovac | |
| 3,185,275 A * | 5/1965 | Orwin | ......................... 192/56.57 |
| 3,472,347 A | 10/1969 | Johnson | |
| 3,722,644 A | 3/1973 | Steinhagen | |
| 3,774,738 A | 11/1973 | Steinhagen | |
| 3,930,422 A | 1/1976 | Morimatsu | |
| 3,979,925 A | 9/1976 | Kato | |
| 4,220,230 A | 9/1980 | Hansen | |
| 4,239,096 A | 12/1980 | Smilgys et al. | |
| 4,263,996 A | 4/1981 | Putney | |
| 4,838,400 A | 6/1989 | Fortune | |
| 5,253,573 A | 10/1993 | Modoux | |
| 5,346,022 A | 9/1994 | Krivec | |
| 5,855,517 A | 1/1999 | Lepold | |
| 6,295,910 B1 | 10/2001 | Childs et al. | |
| 7,137,329 B1 | 11/2006 | Moser | |

FOREIGN PATENT DOCUMENTS

| | | |
|---|---|---|
| EP | 1731266 | 12/2006 |
| GB | 2 275 745 | 9/1994 |
| RU | 2003882 C1 * | 11/1993 |

* cited by examiner

*Primary Examiner* — Greg Binda
(74) *Attorney, Agent, or Firm* — Greer, Burns & Crain, Ltd.

(57) ABSTRACT

A decoupling mechanism for a power tool having a motor driving a drive shaft that drives a rotating component includes a shaft gear disposed around the drive shaft. The shaft gear has a first side and a second side. The second side has at least one shallow receiving structure and at least one deep receiving structure. At least one friction plate is disposed on the drive shaft adjacent to the first side. At least one pressure plate is disposed on or integrally part of the drive shaft adjacent to the friction plate and configured for rotation with the drive shaft. A spring assembly is biased against the shaft gear. The spring assembly includes a plate disposed around the drive shaft and a spring member. At least one cam is disposed between the plate and the shaft gear, and is configured to engage with the shallow and deep receiving structures.

15 Claims, 8 Drawing Sheets

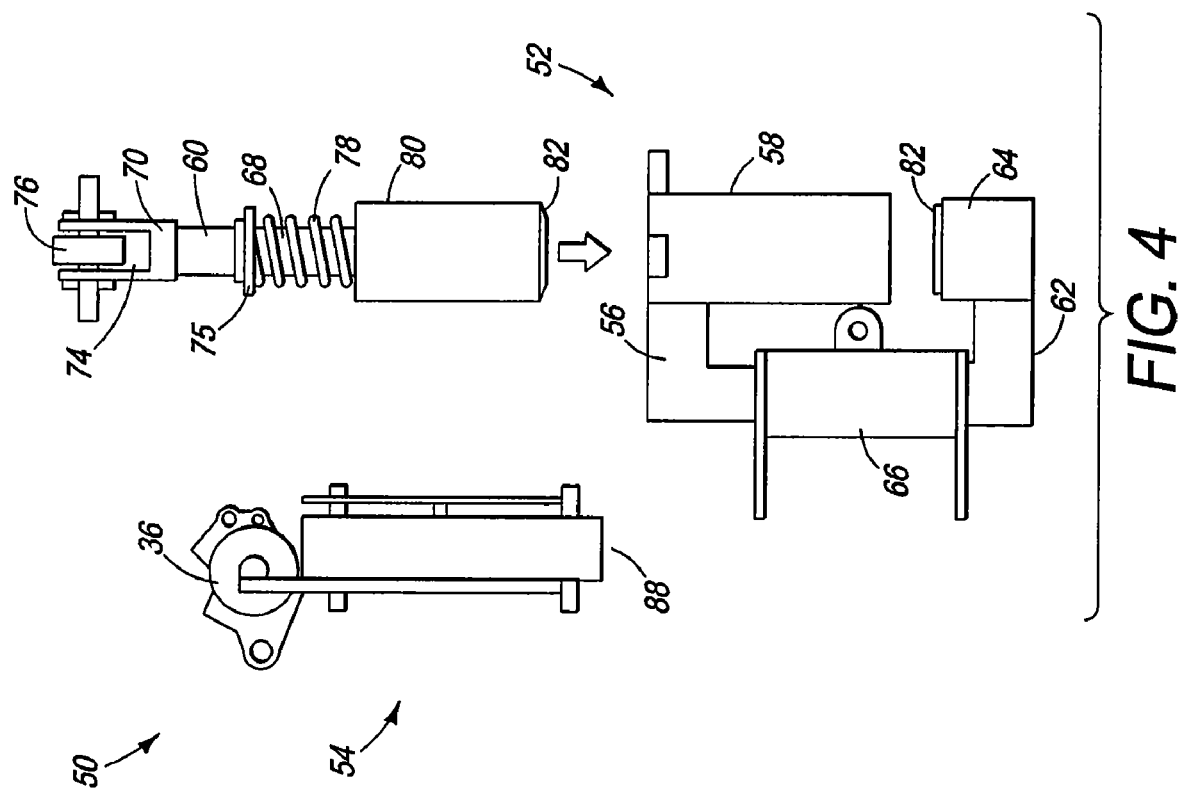
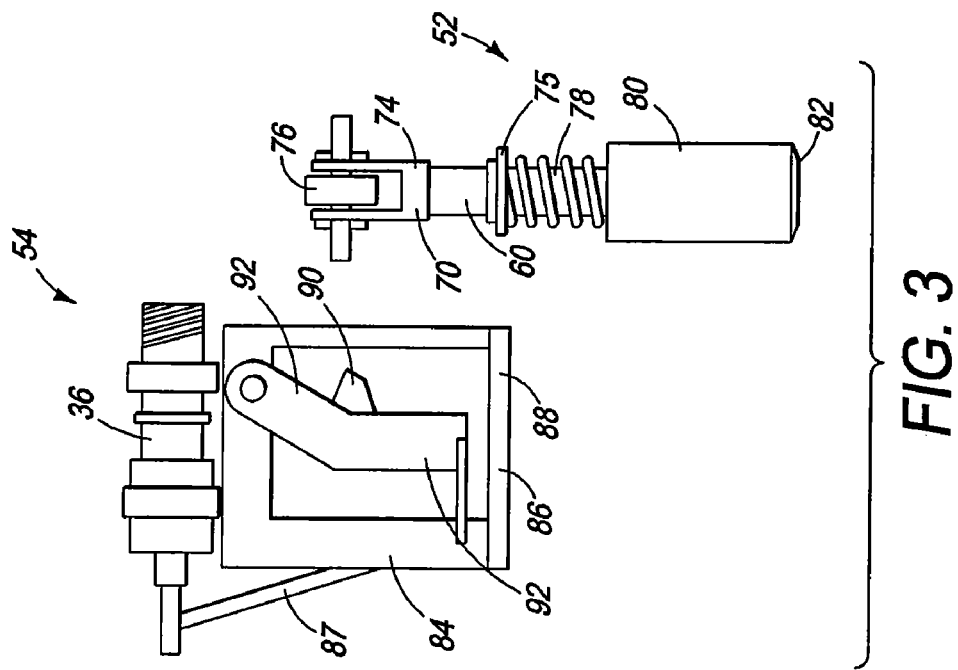

DECOUPLING MECHANISM FOR POWER TOOLS

CROSS REFERENCE TO RELATED APPLICATION

The present application claims priority to Provisional Application No. 60/902,195 titled "Decoupling Mechanism for Power Tools" filed on Feb. 20, 2007, Provisional Application No. 60/902,196 titled "Injury Mitigation System for Power Tools" filed on Feb. 20, 2007, and Provisional Application No. 60/922,486 titled "Clutch for Injury Mitigation System for Power Tools" filed on Apr. 9, 2007, which are specifically incorporated by reference.

BACKGROUND OF THE INVENTION

The present invention generally relates to power tools, and more particularly, to a decoupling mechanism that can be used as part of safety detection and protection systems for power tools such as circular saws of the type that are used for cutting wood and other materials.

For as long as power tools have existed, there has been concern for the safety of those who operate them. This is particularly true with regard to power tools of the type which have relatively large exposed moving blades that can easily cause serious injury to individuals who carelessly use the tool or who are the victim of a true accident that results from unforeseen conditions. While safety systems have been developed for machine tools and other commercial tools, such as stamping tools, punch presses and other machines which exert great force in manufacturing metal and other parts, such systems often have a level of sophistication and complexity that is achieved only at a cost that is prohibitive if considered for use in tools that are marketed to individual consumers or small contractors and tradesmen.

More particularly, the well known circular saw that is used by woodworkers and tradesmen has a rotating blade that can be exposed during use even though blade guards have been provided with such saws when sold for the last several decades. Such blade guards, while effective to prevent some injuries, are considered unwieldy by many operators. In fact, many operators find that such blade guards actually interfere with the use of the circular saws and therefore remove such blade guards most of the time. Obviously, a rotating circular saw blade can cause great injury to an operator and countless hand injuries occur annually because of careless use or the occurrence of fortuitous accidents.

Safety systems have been developed for use on saws to stop the blade when the operator's hand approaches the blade and which trigger a brake mechanism that typically includes a pawl structure that is urged into the blade by a biasing mechanism that is retained by a fusible member that is melted by a high energy electrical current. Severing the fusible member releases the pawl to stop the blade, or in some embodiments causes the blade to be retracted down below the work surface in the case of the system being utilized with a table saw. All of these systems have one or more disadvantages in terms of cost, convenience of use, early and effective detection of a dangerous condition and the ability to provide graduated protective actions as a function of the characteristics that develop during a potentially dangerous condition. Further, many protection systems are destructive to the blade to the extent that the blade must be replaced after a braking event.

The blade is driven by the drive shaft, which is in turn driven by the motor. In some protection systems, the blade is decelerated or stopped upon sensing a dangerous condition. When enough pressure or torque is supplied to the saw blade to decelerate or stop the blade, a force is exerted on the drive shaft to slow or stop with the blade. However, the drive shaft continues to be driven with the torque provided by the motor. Since the drive shaft is being acted upon by both the motor on one end, and the pressure/torque applied to the blade on the other end, the saw is vulnerable to failure. For this reason, a decoupling mechanism is needed to decouple the motor from the blade.

SUMMARY OF THE INVENTION

The present saw comprises a decoupling mechanism that can be used in combination with a detection system and a protection system for minimizing the possibility of an operator being injured by contacting the blade.

In one embodiment, a decoupling mechanism for a saw having a motor driving a drive shaft that drives a rotating blade is provided. The decoupling mechanism includes a shaft gear disposed around and displaceable along the drive shaft. The shaft gear has a first side and a second side, where the second side has at least one shallow receiving structure and at least one deep receiving structure. At least one pressure plate is disposed on or integrally formed with the drive shaft on a first side of the shaft gear and configured for rotation with the drive shaft. A spring assembly is biased against the shaft gear. The spring assembly is disposed on the drive shaft on a second side of the shaft gear and is configured to apply a normal force on the shaft gear to frictionally transfer motor torque from the shaft gear to the pressure plate. At least one cam is disposed between the plate and the shaft gear. At least one shallow receiving structure and at least one deep receiving structure oppose the spring assembly. When the at least one cam is engaged in the shallow receiving structure, the shaft gear applies pressure on the pressure plate to couple the motor to the drive shaft. When the cam is engaged in the deep receiving structure, the at least one friction plate does not apply pressure to the pressure plate so that the motor is uncoupled from the drive shaft.

DESCRIPTION OF THE DRAWINGS

FIG. 3 is an exploded view of a braking mechanism including a side view of a brake actuation mechanism and a top view of a first caliper member.

FIG. 4 is an exploded view of the braking mechanism including a top view of the brake actuation mechanism, a front view of the first caliper member, and a top view of the caliper brake mechanism.

DETAILED DESCRIPTION OF THE EMBODIMENTS OF THE PRESENT INVENTION

Briefly stated, the present decoupling mechanism will be shown and described with an injury mitigation system, including various embodiments of a detection system as well as various embodiments of a protection system that can operate to mitigate injury to the tissue of an operator during operation of a power tool. While the embodiments that are illustrated and described herein comprise systems for a circular saw, it should be understood to those of ordinary skill in the art that the detection system as well as aspects of the protection systems are applicable to other power tools. The invention is also applicable to other broader applications that may be implemented in various industries and endeavors. Shop tools other than circular saws are particularly capable of having detection and protection systems adapted for their use, using the concepts and principles of the embodiments shown and described herein.

Generally, the detection system senses when an operator makes contact with the blade and initiates the protection system. The protection system preferably initiates a braking mechanism, a stopping mechanism and a clutch mechanism so that the blade will stop rapidly.

Figure 1:
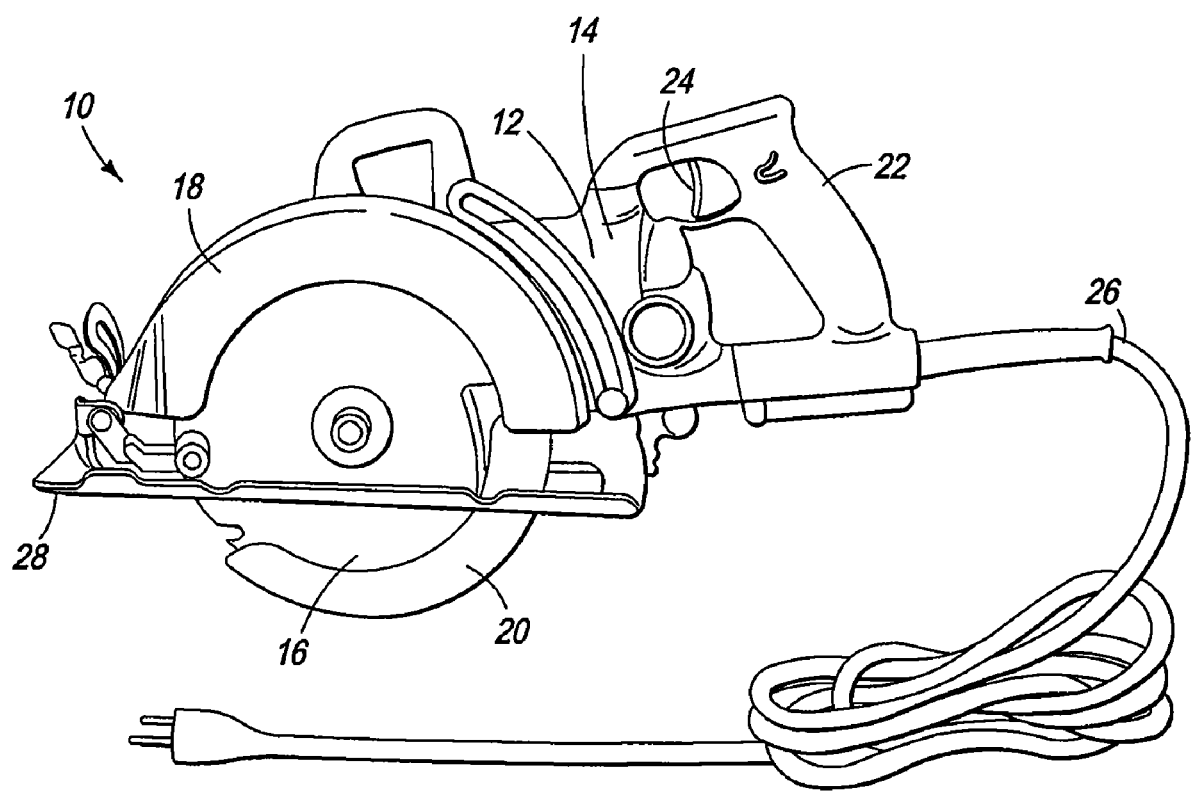
FIG. 1 is a side view of a circular saw having an injury mitigation system of the present invention including a detection system and a protection system.

Referring now to FIG. 1, a representative circular saw is indicated generally at 10 and includes a motor 12 disposed in a motor housing 14, which is used to rotate a blade 16 housed in an upper protective guard 18 and a lower guard 20. A handle 22 extends from the motor housing 14 and includes a trigger 24 and a power cord 26. A base plate 28 is generally transverse to the blade 16 and extends around the blade.

Figure 2:
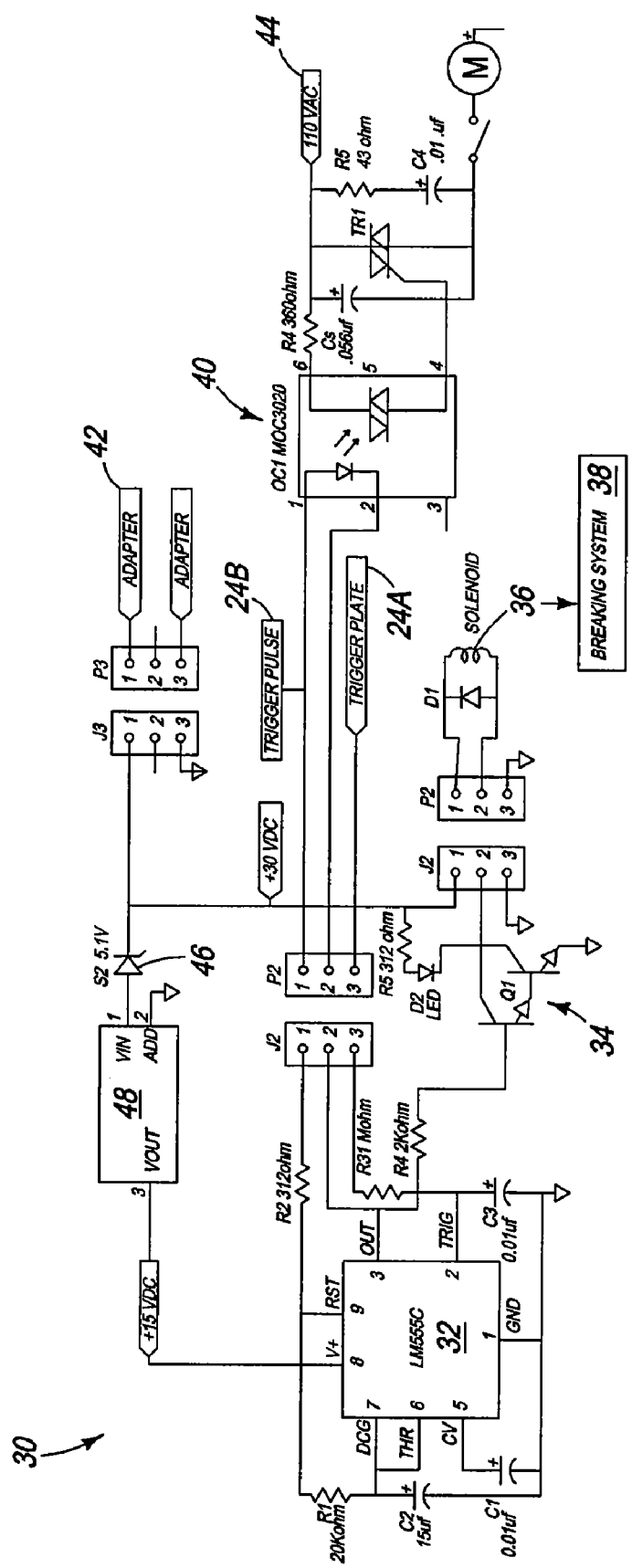
FIG. 2 is an electrical schematic diagram of representative circuitry for the detection system.
Figure 5:
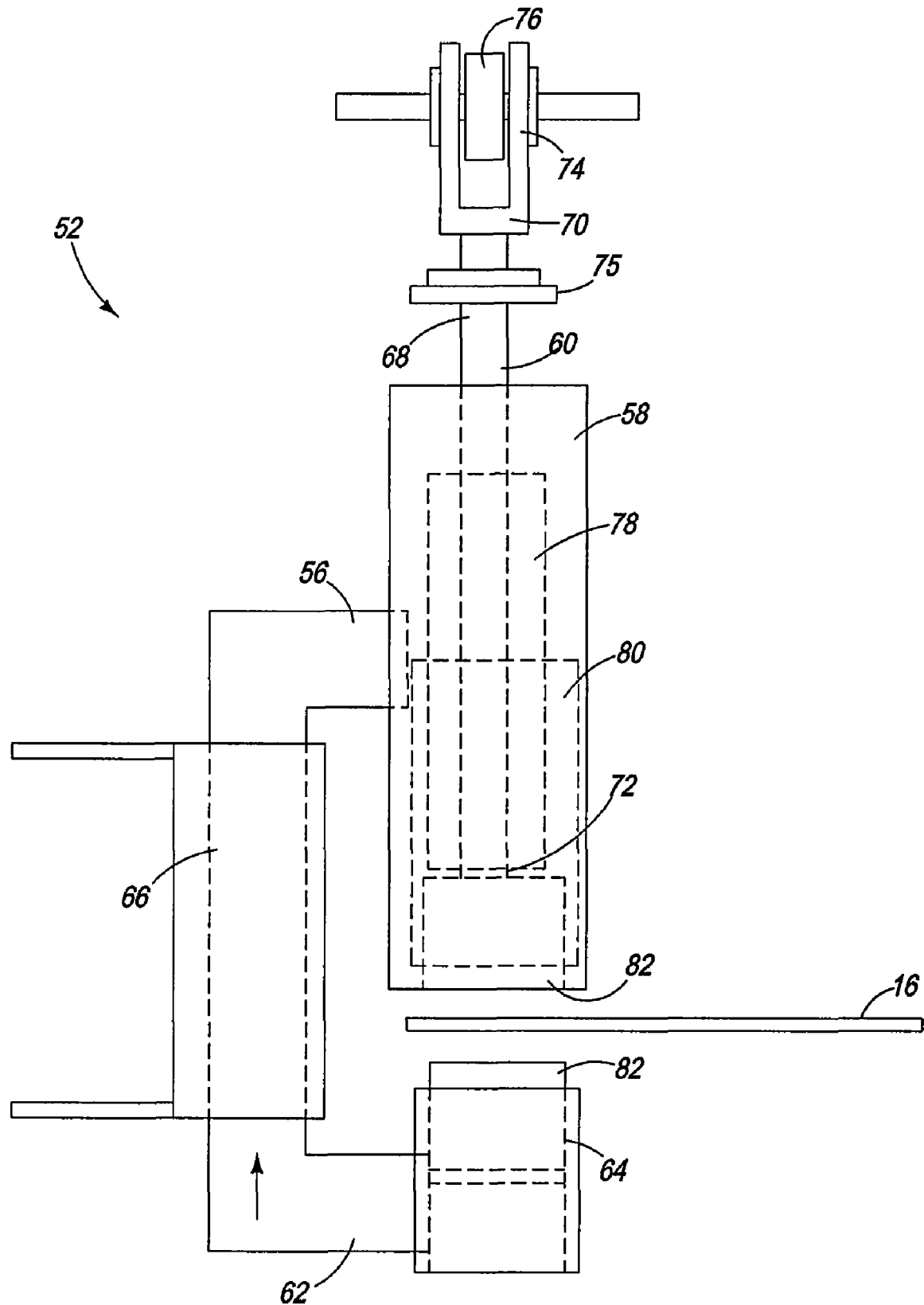
FIG. 5 is a side view of the caliper brake mechanism including first and second caliper members.
Figure 6:
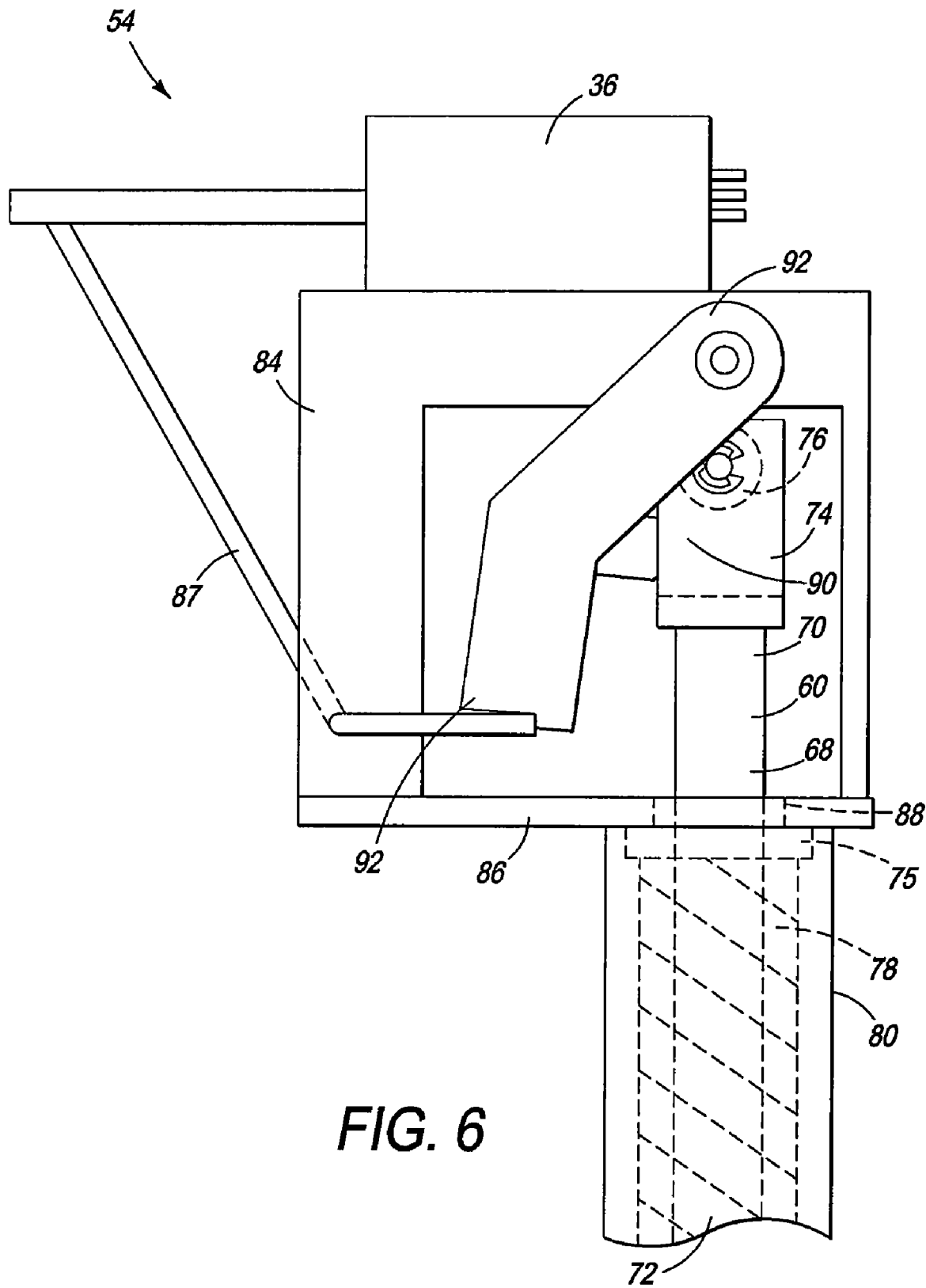
FIG. 6 is a side plan view of the brake actuation mechanism and the first caliper member mounted in the brake actuation mechanism.

Referring now to FIG. 2, the detection system 30 will be described. The detection system 30 is configured to detect when an operator makes contact with the blade 16, and to initiate the protection system. For an effective detection system 30, it is necessary that the detection of the operator's contact with the blade 16, as well as the generation of an actuating signal to the protection system, be done in a very short time. While the amount of time can vary upwardly or downwardly depending upon the nature of operation of the detecting system 30 and specific operation conditions, generally the faster the operation of the detection system the better.

In order to operate a circular saw 10, the operator must constantly hold the trigger 24 down. The present detection system 30 operates by applying a voltage to the trigger plate 24A of the saw. The trigger 24 includes circuitry which is capable of detecting the absence of a voltage on the trigger. When the operator's body comes into contact with the blade 16 (such as with the operator's fingers), the operator's body shorts the voltage on the trigger 24A to ground. In other words, the operator's body completes the circuit to ground by touching the blade 16.

The missing voltage on the trigger plate 24A is detected by a timing circuit or sensor 32 (preferably a 555 timer), which emits an actuating signal to activate a transistor switch 34 (preferably a Darlington type transistor or relay), which energizes a solenoid or relay 36 to actuate a braking mechanism. It is contemplated that the solenoid 36 can be energized in response to a measured predetermined duration of the absence of applied voltage to the trigger plate 24A.

In the preferred embodiment, +15 volts is constantly applied through the operator's body by the operator's finger making contact with the trigger plate 24A. It is contemplated that other voltages can be used that are relatively comfortable for the user. When the operator shorts the electricity to ground, the 555 timer 32 senses a drop in voltage on the trigger. When the 555 timer 32 senses the drop in voltage, it sends a +15 volt output charge to activate the Darlington transistor 34. The Darlington transistor 34 acts as a switch for the solenoid 36 to release the braking mechanism on the blade 16.

With regard to the specific circuitry that is used in the preferred embodiment of detection system 30, the electrical schematic diagram of representative circuitry is shown in FIG. 2. The following description refers to the preferred circuitry of FIG. 2.

To run a safe voltage to the operator through the trigger plate 24A, the dangerous voltages running to the saw 10 are isolated from the operator. When the dangerous high voltage is isolated, the operator is able to contact the trigger to complete part of the circuit at a relatively low voltage. In the preferred embodiment, this isolation is accomplished by making an optiosolator circuit, indicated generally at 40, which isolates the high voltage (input from the 110V socket 44) from the low voltage (input from a 30V adapter 42).

The optoisolator circuit 40 uses an extension of the main power wire using 14 AWG wire with #10 solderless terminals for connections. A 43Ω resistor (R5), 01 µF capacitor (C4), and a snubberless 600 V, 25 A TRIAC (TR1) are wired to the optoisolator extension in the circuit. A TRIAC (Triode or relay for alternating current) is a bidirectional electronic switch that can conduct current in either direction when it is triggered. From the snubberless TRIAC (TR1), a 0.056 µF (C5), a 360Ω resistor (R4) are wired to pin 6 of the optoisolator TRIAC-output 6 DIP. The snubberless TRIAC is wired to pin 4 of the optoisolator TRIAC-output. Pin 1 of the optoisolator TRIAC-output (40) is preferably connected to a 2×0.5×0.02" copper sheet molded around the trigger 24 forming the trigger plate 24A, preferably with a #10 solderless terminal and #4-40×¼" round head slotted zinc bolt and nut. The trigger is preferably wired to pin 2 on the precision 555 timer 8-DIP. Pin 2 on the optoisolator TRIAC-output (40) is preferably connected to pin 3 on the 555 timer 32.

In the preferred embodiment, the power of a 30 V 400 mA, AC to DC adaptor (32) is emitted through 22 AWG four wire shielded communications wire to a 5 V, 1A zenor diode (46) before reaching a +15V, 1A voltage regulator (48) for the low-voltage electrical components. While a 400 mA power supply 42 is incorporated, it is contemplated that other power supplies can be used. Preferably, 18-AWG four wire shielded communications wire is used to connect the touch switch to 18-DIP and 8-DIP sockets containing: the 555 timer (32), 0.01 µF capacitor one (C1), 15 µF (C2), 0.01 µF (C3), 20 KΩ resistor one (R1), 312 Ω(R2), 1 MΩ (R3), and the NPN 100 V Darlington transistor (34). A 22-AWG four wire shielded communications wire runs from the adaptor (32) and the 555 timer (32) and base of the Darlington transistor (34) to the 0.75" diameter 28 VDC tubular solenoid (36). The solenoid (36) is attached to a grounded bolt with a #12 solderless terminal.

When the voltage on the trigger decreases, the optoisolator 40 will preferably shut down the TRIAC (TR1). In turn, the TRIAC (TR1) will preferably shut down the power to the motor 12.

Referring now to FIGS. 3-6, the detection system 30 is used to actuate a braking mechanism, indicated generally at 50, to initiate braking of the blade 16. Preferably, the braking mechanism 50 is configured to completely stop the blade 16 within 0.05 seconds of the operator contacting the blade.

The braking mechanism 50 includes a caliper brake mechanism indicated generally at 52, and a brake actuation mechanism indicated generally at 54. The brake actuation mechanism 54 includes the solenoid 36 of the detection system, which actuates the caliper brake mechanism 52 to clamp down onto the blade 16. Preferably, the caliper brake mechanism 52 clamps down onto the blade 16 generally near the periphery of the blade, but generally radially inward from the teeth of the blade.

The caliper brake mechanism 52 is generally "C"-shaped with a first portion 56 including a tube 58 for slidingly receiving a first caliper member 60, a second portion 62 including a second caliper member 64, and a tube 66 located therebetween. When the first caliper member 60 is disposed in the tube 58, the first caliper member 60 and the second caliper member 62 are generally coaxial and oppose each other.

The first caliper member 60 includes a rod 68 having a proximal end 70 and a distal end 72. The proximal end 70 has an extension member 74 that extends from the rod 68 and an engaging structure 76 generally transverse to the rod. A retainer member 75 is preferably slidingly and concentrically disposed on the rod 68 beneath the extension member 74. The retainer member 75 prevents the displacement of a concentrically disposed compression spring 78 to the extension member 74.

The compression spring 78 extends down into a cylindrical casing 80 that is concentrically disposed around the rod 68. Inside the casing 80, the rod 68 is attached to a generally cylindrical rubber stopper 82 that protrudes from the casing. The rod 68, the casing 80 and the rubber stopper 82 preferably have a static relationship to each other.

The proximal end 70 of the first caliper member 60 is mounted into the brake actuation mechanism 54. The brake actuation mechanism 54 includes a generally "L"-shaped frame 84 having a retention bracket 86. The retention bracket 86 includes a receiving structure 88 for receiving the retainer member 75 of the first caliper member 60, which is placed underneath the retention bracket 86.

When the retainer member 75 is in the receiving structure 88, the proximal end 70 of the first caliper member 60 is pulled upwards against spring force as the retainer member is slid downwardly along the rod 68, until the engaging structure 76 of the first caliper member 60 is received in a releasable structure 90 of the brake actuation mechanism 54. The releasable structure 90 holds the proximal end 70 extended from the retainer member 75 against spring force.

The releasable structure 90 is on at least one, and preferably a plurality of linkages 92 that are attached to the frame 84 of the brake actuation mechanism 54. The releasable structure 90 is generally low in friction and allows the first caliper member 60 to be slidingly released. A lever member 87 is actuated by the solenoid 36 to move the linkages 92. In this configuration, the detection system of FIG. 2 actuates the brake actuation mechanism 54 to let out the compression spring by a signal to the solenoid 36 to pull in. When the linkages 92 are moved by the solenoid 36 pulling in on the lever member 87, the releasable structure 90 pivots out from under the engaging structure 76 to release the compression on the compression spring 78. When the releasable structure 90 is pivoted, the first caliper member 60 is free to displace downward, and is pulled by the compression spring pulling against the retention bracket 86.

The distal end 72 of the first caliper member 60 is slidably received into the tube 58. When the engaging structure 76 is released from the releasable structure 90, the rod 68 slidingly extends from the tube 58 and engages the saw blade 16. When the engaging structure 76 is released from the releasable structure 90, the potential energy stored on the compression spring 78 is exerted on one side of the saw blade 16. Substantially simultaneously, the "C"-shaped brake mechanism 52 displaces with respect to the stationary tube 66 in the direction indicated in FIG. 5. When the first and second portions 56, 62 displace, the second caliper member 64 engages the blade 16 at the opposite side of the blade from the first caliper member 60.

The caliper brake mechanism 52 grips the saw blade 16 between the first caliper member 60 and the second caliper member 64. The rubber stoppers 82, preferably made of black neoprene with a flat head, are preferably disposed at the distal ends of both the first and the second caliper members 60, 64 to provide additional frictional resistance. Since both the first and the second caliper members 60, 64 grip the blade 16 at opposing surfaces, the blade is not bent by the brake mechanism 52 during a braking event.

In one particular embodiment, about 0.25 inches of the total spring compression is used through the extension of the first caliper member 60 of about 0.125 inches of air space on each side of the blade 16, leaving about 0.25 inches of the spring compression to stop the blade by applying pressure onto the blade. When the brake mechanism 50 is deployed according to this embodiment, the blade 16 should completely stop within less than 0.1 seconds, and preferably within 0.05 seconds, of the operator contacting the blade. It should be understood that the numeric values of this specific embodiment are given only as an example, and the invention should not be limited by these values.

The braking mechanism 50 such that the blade 16 extends between the first and the second caliper members 60, 64. It is contemplated that the braking mechanism 50 can be attached with the bolt that connects the lower shield to the saw 10. Further, in an alternate embodiment to a displacing brake mechanism, the first and second portions 56, 62 of the "C"-shape brake mechanism 52 can pivot inwardly with respect to each other to engage the rubber stoppers 82 on each side of the blade 16.

Figure 7:
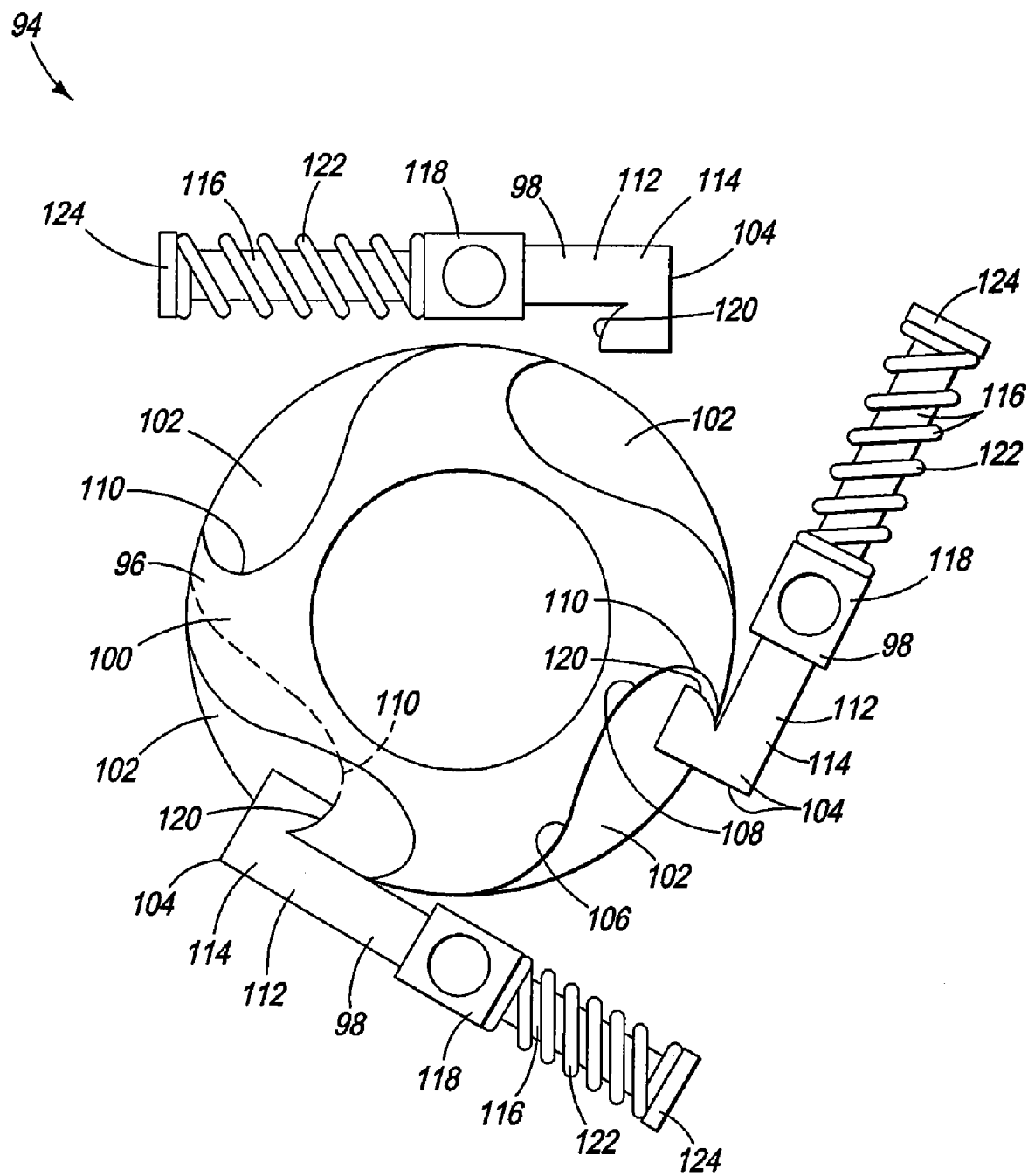
FIG. 7 is a side view of a stopping mechanism including a gear and a latch.

A stopping mechanism, indicated generally at 94, can be used in tandem with, or in place of the braking mechanism 50. Referring now to FIG. 7, the stopping mechanism 94 includes a gear 96 that is static with respect to the blade 16, i.e. rotates with the blade. The stopping mechanism 94 also includes a pivoting latch 98 mounted adjacent the gear 96. A top surface 100 of the gear 96 is generally planar and has detents 102 formed into the surface. The detents 102 are configured to engage with a first end 104 of the pivoting latch 98.

The gear 96 rotates with the blade 16 in the clockwise direction as depicted in FIG. 7. In the preferred embodiment, there are four detents 102 that have a curved shape including a smaller end 106 that gradually increases to a larger end 108. The larger end 108 has a generally concave receiving structure 110.

The pivoting latch 98 includes a moveable member 112 having a first leg 114 and a second leg 116 that is slidingly disposed through a tube 118. On the first leg 114, the moveable member 112 includes a hook structure 120 having a corresponding and generally convex shape to the generally concave receiving structure 110. In this configuration, the receiving structure 110 and the hook structure 120 of the pivoting latch 98 are configured to engage each other such that when the pivoting latch is lowered into range of the gear 96, the pivoting latch will be pulled under and locked into the receiving structure 110 of the detent 102.

On the second leg 116, a coil spring 122 encircles the moveable member 112. The tube 118 is preferably attached to the saw 10 and is pivotable to allow the pivoting latch 98 to pivot towards the gear 96 upon being actuated.

In the first, top position in FIG. 7, the pivoting latch 98 is generally tangential to the gear 96 and is restrained from engaging with the gear with an electromagnet (not shown), however other actuators are contemplated such as a solenoid actuator. Further, it is contemplated that the solenoid 36 of the detection system 30 can actuate the stopping mechanism 94.

In the second, side position of the pivoting latch 98 in FIG. 7, the current running through the electromagnet is reversed, switching the poles, and moving the pivoting latch so that the hook structure 120 is engaged into the detent 102 and locked by the receiving structure 110. As the gear 96 rotates, the pivoting latch 98 is pivoted to orient itself at an angle to engage the gear at.

In the third, bottom position in FIG. 7, the pivoting latch 98 continues to pivot as the hook structure 120 is engaged. To dampen the relatively abrupt stop of the blade 16, the moveable member 112 is pulled through the tube 118 while compressing the coil spring 122 between a second end 124 of the pivoting latch 98 and the tube. When the compression of the coil spring 122 is at a maximum compression, the blade 16 stops. The coil spring 122 will recoil and send the blade 16 spinning in the reverse direction (counterclockwise direction as depicted in FIG. 7) while unlatching and resetting the stopping mechanism 94.

It is contemplated that a pin or other mechanism can be used to prevent the recoil and the spinning of the blade 16 in the opposite direction. It is also contemplated that instead of detents 102 in the top surface 100, that the detents can be cut-away or removed.

Figure 8:
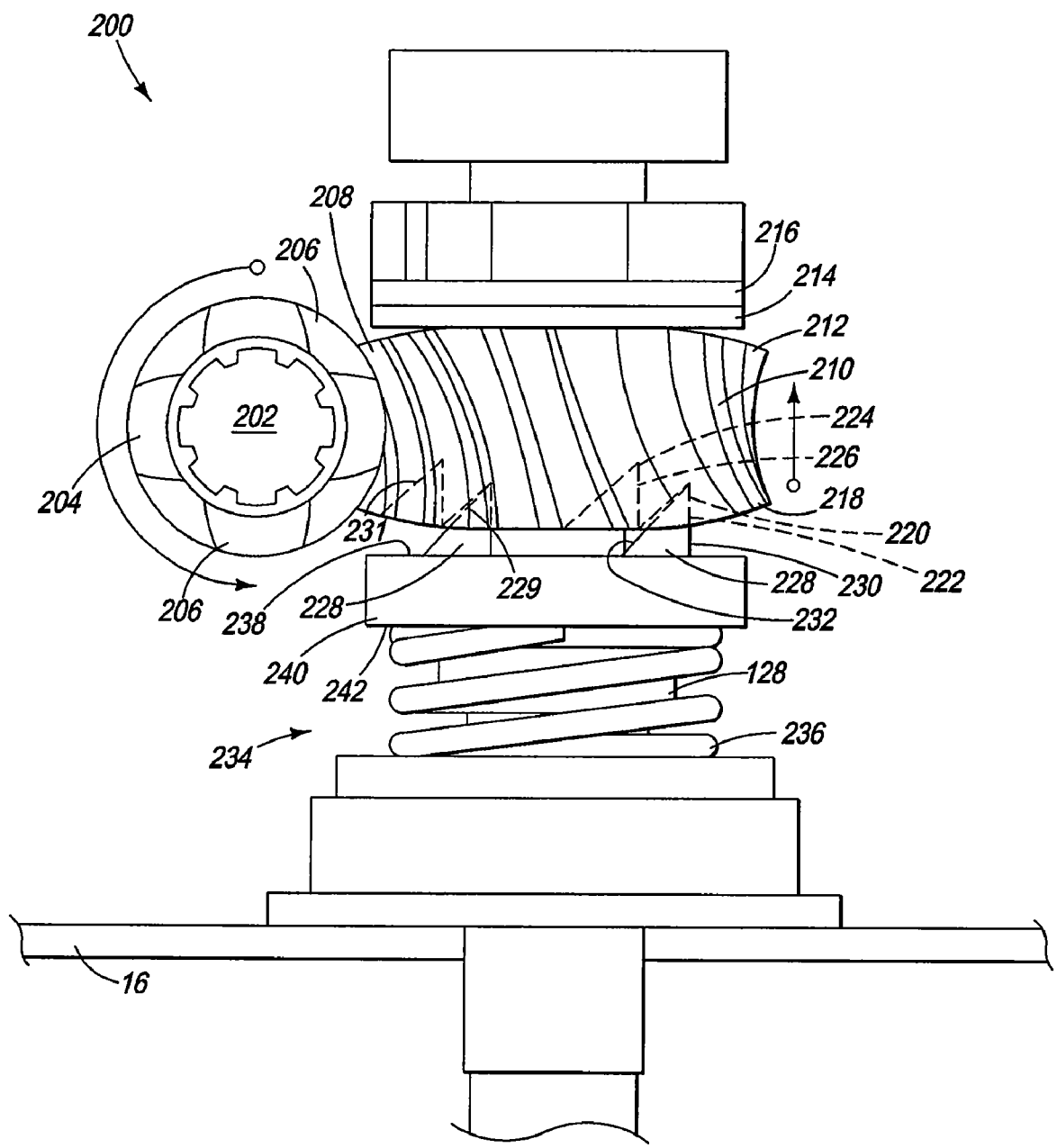
FIG. 8 is a side plan view of a gear shaft having a decoupling mechanism of a first embodiment.

Referring now to FIG. 8, a decoupling mechanism indicated generally at 200 is located on the drive shaft 128. The decoupling mechanism 200 isolates the inertia on a motor output shaft 202 of the motor 12 from the drive shaft 128 when pressure or torque is applied to the blade 16, such as when the braking mechanism 50 and/or the stopping mechanism 94 is applied, or kickback situations.

The motor 12 is connected to a worm gear 204 with the motor output shaft 202. In FIG. 8, the motor output shaft 202 is transverse from the drive shaft 128. The worm gear 202 has angled teeth 206 that engage angled teeth 208 of a shaft gear 210 to exert force at a first side 212 of the shaft gear against at least one friction plate 214, which in turn exerts force onto a pressure plate 216 attached to the drive shaft 128. The second, opposite side 218 of the shaft gear 210 preferably has a first cam receiving structure 220, which in this embodiment is three shallow receiving structures 222 having an angled shape that are spaced generally equidistant and annularly around the shaft gear 210, although other numbers and shapes are contemplated. Additionally, the second side 218 of the shaft gear 210 preferably has a second cam receiving structure 224, which in this embodiment is three deep receiving structures 226 having an angled shape and also spaced generally equidistant and annularly around the shaft gear 210, although other configurations are contemplated.

While the preferred embodiment has three shallow receiving structures 222 and three deep receiving structures 226, it is contemplated that other numbers of receiving structures can be used. Both the set of shallow receiving structures 222 and the set of deep receiving structures 226 are configured for receiving a set of three ramp members 228 generally corresponding in shape to the receiving structures 222, 226.

The ramp members 228 are generally triangular, with a first member side 230 generally parallel to the drive shaft 128 and a second generally angled member side 232. The ramp members 228 are disposed on a cam mechanism, indicated generally at 234, that is biased against the shaft gear 210 with a compression spring 236. Specifically, the ramp members 228 are disposed on a first side 238 of a ramp plate 240 that is biased by the compression spring 236 located on a second side 242 of the ramp plate to push the ramp members against the shaft gear 210. The angle of the teeth 206 on the worm gear 202 and the teeth 208 on the shaft gear 210 are configured to apply pressure on the pressure plate 216 in the same direction as the compression spring 236.

In normal operation, the ramp members 228 are engaged in the shallow receiving structures 222, and the compression spring 236 exerts force against the shaft gear 210 to increase force against the friction plate 214 and pressure plate 216. In this configuration, the torque from the motor 12 is transmitted from the worm gear 204, to the shaft gear 210, to the friction plate 214, to the pressure plate 216, and up through to the saw blade 16.

When enough pressure or torque is supplied to the saw blade 16 by the braking mechanism 50, the stopping mechanism 94, or a potential kickback situation, the shaft gear 210 continues to rotate with the motor 12, while the drive shaft 128 rotates with the blade relative to the shaft gear. Specifically, shaft gear 210 moves relative to the ramp members 228 on the ramp plate 240. When this occurs, the ramp members 228 ascend out of the shallow cam angles 222 as the bias of the compression spring 236 is overcome. The ramp member 228 ascends out of the shallow cam angle 222 by traversing the angled side 229 of the shallow hole with its corresponding angled member side 232. In one embodiment, the angled side 229 has a smaller slope than an angled side 231 of the deep receiving structure 226.

Then, the ramp members 228 drop into the three deep receiving structures 226. In the deep receiving structures 226, most or all of the spring compression is relieved and the shaft gear 210 is no longer in tight contact with the friction plate 214, and the shaft gear 210 does not transmit torque to the drive shaft 128. In this configuration, the blade 16 is decoupled from the driving power of the motor 12 and the motor output shaft 202 inertia, and the drive shaft 128 is able to rotate relative to the shaft gear 210.

To reset the decoupling mechanism 200, the operator can manually turn the saw blade 16. As the blade 16 is turned, the ramp members 228 ascend the angled member side 232 of the deep receiving structure 226 and traverse the second side 218 of the shaft gear 210 until the ramp members 228 engage the next of the three shallow cam angles 222 for normal operation.

Figure 9:
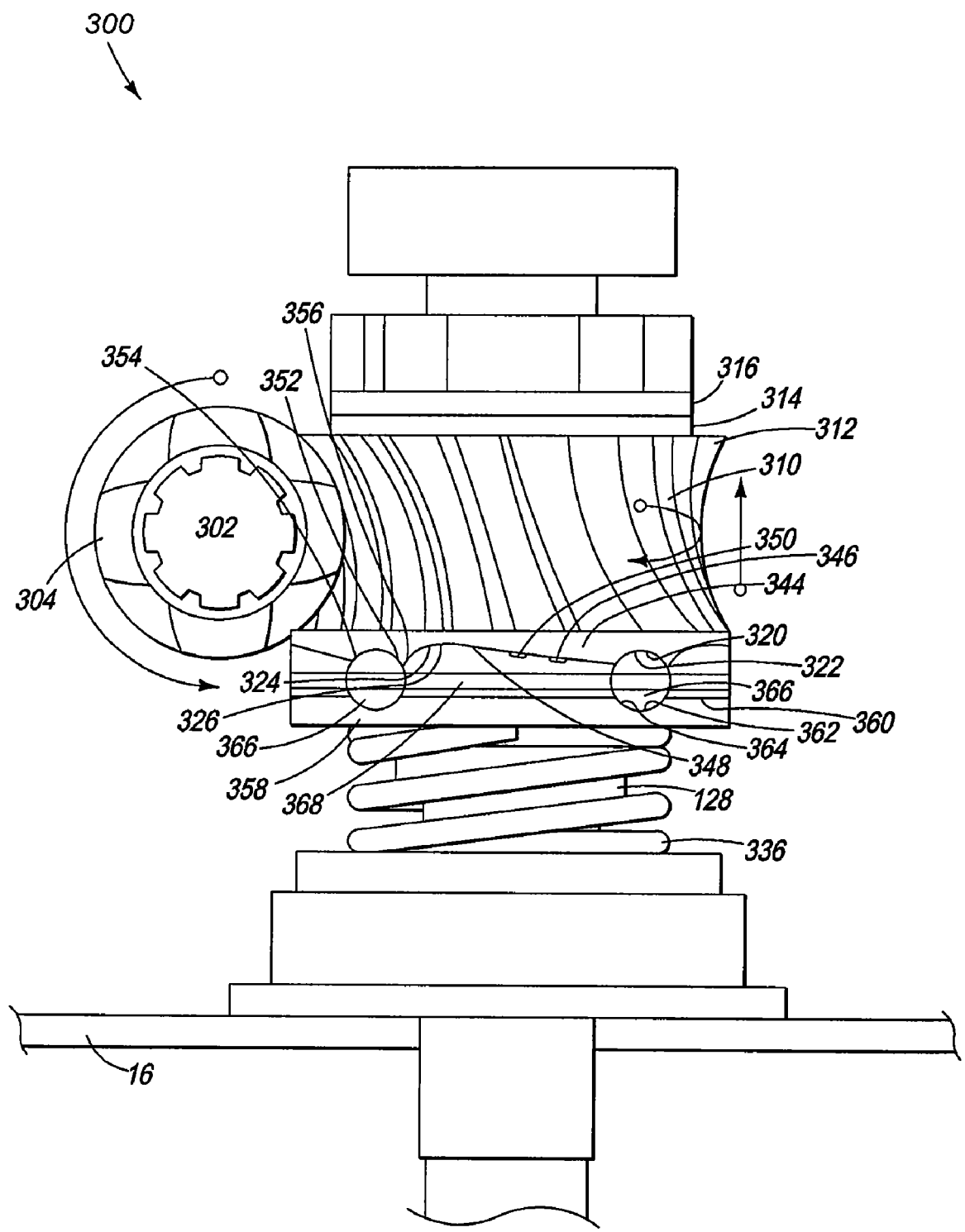
FIG. 9 is a side plan view of a gear shaft having a decoupling mechanism of a second embodiment.

In an alternate embodiment of decoupling mechanism is indicated generally at 300 and shown in FIG. 9. Features similar to the first embodiment 200 are denoted with similar numbering in the 300-series. A worm gear 304 exerts force onto a shaft gear 310, which in turn exerts force against at least one friction plate 314 and a pressure plate 316 attached to the drive shaft 128. The shaft gear 310 has a first side 312 that is generally coplanar with the friction plate 314. A cam plate 344 is attached to or integrally formed with the shaft gear 310 to act as an extension of the shaft gear.

The cam plate 344 has a bottom surface 346 that preferably includes a plurality of cam contour structures 348. In the preferred embodiment, there are three cam contour structures 348 disposed at 120-degree sectors around the cam plate 344, however other numbers of cam contour structures 348 are contemplated. Each cam contour structure 348 includes a first cam receiving structure 320, a second cam receiving structure 324, and a slanted guide 350 between the first and second receiving structures.

In this embodiment, the first cam receiving structure 320 is a shallow receiving structure or contour 322, and the second cam receiving structure 324 is a deep receiving structure or contour 326. Each shallow cam contour 322 has a generally semi-circular shape, with a first side 352 extending away from the shaft gear more than a second side 354. Each deep cam contour 326 preferably has a first side 356 and no second side. Instead, the slanted guide 350 transitions to the deep cam contour 326 from the second side 354 of the shallow cam contour 322. Preferably, the first side 356 of the deep cam contour 326 is common to the first side 352 of the shallow cam contour 322.

Spaced along the drive shaft 128, and opposing the first and second cam receiving structures 320, 324 is an outer plate 358. The outer plate 358 has a first side 360 including a third cam receiving structure 362, which in this embodiment, is an opposing cam contour 364. There are preferably three opposing cam contours 364 spaced equidistantly and annularly around the outer plate 358, although other numbers are contemplated. The opposing cam contour 364 is generally semicircular and configured to receive a cam 366.

In normal operation, each cam 366 is received into the shallow cam contour 322 and also into the opposing cam contour 364. It is contemplated that the cam 366 can be cylindrical, spherical, conical, ellipsoidal, among other shapes. A cage member 368 is disposed between the cam plate 344 and the outer plate 358 to maintain the relative position of the cams 366, preferably at 120-degrees apart from each other. In this configuration, all cams 366 are either in the set (engaged in the shallow cam contours 322) or in the released position (engaged in the deep cam contours 326) at the same time, unless they are all between the two positions while rolling along the slanted guide 350 to the deep cam contour.

To transmit torque from the motor 12 during normal operation, the three cams 366 remain stationary with respect to the shaft gear 310 (i.e. rotate with the shaft gear) while in tight contact with the shallow cam contours 322 and the opposing cam contours 364. When the cams 366 are tightly engaged in the shallow cam contours 322 and the opposing cam contours 364, a compression spring 336 exerts force against the outer plate 358, which exerts force on the shaft gear 310 to increase force against the friction and pressure plates 314, 316, thus transmitting the torque from the motor 12 through to the saw blade 16.

When there is a high amount of pressure or torque applied to the blade 16, the cams 366 will ascend the second side 354 of the shallow cam contour 322 and traverse the slanted guide 350 to the deep cam contour 326. When the cam 322 is in the deep cam contour 326, spring compression is relieved and the friction applied by the worm gear 304 is decreased to the extent that the shaft gear 310 no longer transmits the torque to the drive shaft 128. In this way, the blade 16 is decoupled from the driving power of the motor 12 and the motor output shaft 302 inertia, and kickback is avoided. To reset the decoupling mechanism 300, the saw operator can manually turn the saw blade 16 until the cams 366 ascend the slanted guide 350 and engage the next of the three shallow cam contours 322 for normal operation. The angle of the slanted guide 350 is shallower than the relatively steep first side 356 of the deep cam contour 326 to facilitate manual resetting by turning the blade 16 in the opposite direction than the saw normally operates.

In one particular embodiment, when the detection system 30 and a protection system (including the braking mechanism 50 and the decoupling mechanism 200, 300) were implemented on the circular saw 10, only a minor cut of about 1/16 inch deep was inflicted to the finger-simulated object that contacted the running saw blade 16 before the object was detected and the saw blade braked and decoupled. The detection system 30 detected the decreased voltage on the copper-plated trigger 24 when the operator shorted the voltage to ground on the saw blade 16, and initiated the protection system completely stopping the blade within approximately 0.1 second. It should be understood that the numeric values of this specific embodiment are given only as an example, and the invention should not be limited by these values.

When the detection system 30 senses an operator's contact with the blade 16, the detection system initiates a protection system. The protection system is configured to stop the blade 16, and preferably includes the braking mechanism 30, the stopping mechanism 94 and the decoupling mechanism 200, 300, although the protection system can include additional mechanisms or can exclude at least one of the braking mechanism, the stopping mechanism and the decoupling mechanism.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A decoupling mechanism for a tool having a motor operatively connected to a drive shaft that drives a rotatable tool member, comprising:
   a shaft gear disposed around and displaceable along the drive shaft, said shaft gear being driven by the motor;
   at least one pressure plate disposed on the drive shaft on a first side of said shaft gear and configured for rotation with the drive shaft;
   a spring assembly disposed on the drive shaft on a second side of said shaft gear configured to apply a normal force on said shaft gear to frictionally transfer motor torque from said shaft gear to the pressure plate;
   at least one cam disposed longitudinally with respect to the drive shaft between said spring assembly and said shaft gear, wherein all of said at least one cam are disposed on one side of said shaft gear;
   at least one shallow receiving structure and at least one deep receiving structure opposing said spring assembly;
   wherein when said at least one cam is engaged in said at least one shallow receiving structure, said spring assembly transfers a normal force on said shaft gear which applies said normal force on said at least one pressure plate to couple the motor to the drive shaft, and when said at least one cam is engaged in said deep receiving structure, there is substantially no spring force in said spring assembly, and substantially no normal force is applied to said at least one pressure plate from said spring assembly so that said shaft gear is uncoupled from the drive shaft.

2. The decoupling mechanism of claim 1 wherein said cam has a generally triangular shape.

3. The decoupling mechanism of claim 1 wherein said cam is generally round and rolls between said shallow receiving structure and said deep receiving structure.

4. The decoupling mechanism of claim 3 wherein said spring assembly comprises a spring assembly plate disposed around the drive shaft and spring.

5. The decoupling mechanism of claim 1 further comprising at least one friction plate disposed on the drive shaft adjacent to said first side of said shaft gear and configured for rotation with said shaft gear.

6. A decoupling mechanism for a power tool having a motor driving a drive shaft that drives a rotating component, comprising:

a shaft gear disposed around the drive shaft, said shaft gear having a first side;

a cam plate disposed on said shaft gear and defining said second side of said shaft gear, said second side having at least one cam contour structure including a shallow receiving structure, a deep receiving structure and a slanted guide between said receiving structures;

at least one pressure plate disposed on the drive shaft on a first side of said shaft gear and configured for rotation with the drive shaft;

an outer plate disposed around the drive shaft;

a spring member biasing said outer plate towards said shaft gear;

at least one cam disposed between said outer plate and said shaft gear configured to engage with said cam contour structure, wherein all of said at least one cam are disposed on one side of said shaft gear;

wherein when said at least one cam is engaged in said at least one shallow receiving structure, said shaft gear applies sufficient pressure on said at least one pressure plate to couple the motor by friction to the drive shaft, and when said cam is engaged in said deep receiving structure, said at least one friction plate does not apply sufficient pressure to said at least one pressure plate so that said shaft gear is uncoupled from the drive shaft.

7. The decoupling mechanism of claim 6 wherein in a coupled position, said cam is engaged in said at least one shallow receiving structure, and upon pressure or torque applied to the blade, said shaft gear moves relative to said outer plate to permit said cam to ascend out of said shallow receiving structure against a spring bias, and to traverse said slanted guide to engage in said deep receiving structure to an uncoupled position.

8. The decoupling mechanism of claim 6 wherein said cam plate preferably includes three contour structures disposed at 120-degree sectors around said cam plate.

9. The decoupling mechanism of claim 6 wherein said shallow receiving structure has a generally semi-circular shape, with a first side extending away from said shaft gear more than a second side.

10. The decoupling mechanism of claim 6 wherein said deep receiving structure has a first side, and said slanted guide is disposed on a second side of said deep receiving structure.

11. The decoupling mechanism of claim 6 wherein said outer plate has a first side facing said cam plate, and said first side includes an opposing cam contour.

12. The decoupling mechanism of claim 11 wherein said opposing cam contours are generally semi-circular.

13. The decoupling mechanism of claim 6 further comprising a cage member disposed between said cam plate and said outer plate, and configured to maintain the relative position of said cams.

14. The decoupling mechanism of claim 6 wherein said at least one cam comprises a plurality of cams spaced equidistant and annularly around the drive shaft.

15. The decoupling mechanism of claim 6 wherein said at least one cam is generally round and rolls between said shallow receiving structure and said deep receiving structure.

* * * * *